United States Patent

Bergemann et al.

[15] 3,639,703

[45] Feb. 1, 1972

[54] METHOD AND MEANS FOR MEASURING WEIGHTED NOISE IN A COMMUNICATION LINK

[72] Inventors: Gerald T. Bergemann; Ernest N. Dulaney, both of Marion, Iowa

[73] Assignee: Collins Radio Company, Dallas, Tex.

[22] Filed: Apr. 16, 1969

[21] Appl. No.: 816,728

[52] U.S. Cl. ............................................179/175.3, 324/52

[51] Int. Cl. ..........................................................H04b 3/46

[58] Field of Search ..................179/175.3; 324/77 E, 77 CS, 324/52

[56] References Cited

UNITED STATES PATENTS

| | | | |
|---|---|---|---|
| 3,180,445 | 4/1965 | Schwartz et al | 324/77 |
| 3,508,144 | 4/1970 | Mayer | 179/175.3 |
| 3,514,542 | 5/1970 | Farmer | 179/175.3 |

*Primary Examiner*—Kathleen H. Claffy
*Assistant Examiner*—Douglas W. Olms
*Attorney*—Henry K. Woodward and Robert J. Crawford

[57] ABSTRACT

Disclosed is a means for measuring weighted noise in a link having a test signal spectrum concurrently present including filter means, attenuation means and summing means. Oscillator means and modulator means may be included to increase the frequency level of the communication band at the output of the link prior to measuring the weighted noise.

7 Claims, 5 Drawing Figures

INVENTORS.
GERALD T. BERGEMANN
ERNEST N. DULANEY
BY Henry K. Woodward
ATTORNEY

INVENTORS.
GERALD T. BERGEMANN
ERNEST N. DULANEY
BY Henry K. Woodward
ATTORNEY

INVENTORS.
GERALD T. BERGEMANN
ERNEST N. DULANEY
BY Henry K. Woodward
ATTORNEY

METHOD AND MEANS FOR MEASURING WEIGHTED NOISE IN A COMMUNICATION LINK

This invention relates to systems for measuring noise in a communication link, and more particularly to a method and system for measuring weighted noise in a communication line simultaneously with the presence of a test signal spectrum on the line.

It is conventional practice to test communication lines against established performance standards in order to detect or anticipate trouble in the lines. Such line characteristics as line loss, envelope delay, noise levels and the like are normally measured as a function of frequency. Since human response to noise on a telephone circuit, for example, is dependent on frequency, noise-weighting curves showing the relative interfering effect of noise as a function of frequency have been devised and become standards through the years. In the United States, such units as "DBRN" (decibels above noise), "DBA" (decibels adjusted), and "DBRNC" (decibels above noise—C-message) have been employed with various standard test apparatus. Each of these units is based on relative noise interference at 1,000 hertz (Hz.). The reference power level, or weighting standard, in the U.S. telephone industry standardized at $10^{-12}$ watt or 90 db. below 1 milliwatt at 1,000 hertz.

Heretofore, communication lines have been tested manually. This has been expensive and time consuming with time intervals between tests being rather drawn out. A communication link analyzer has been devised by Collins Radio Company which can automatically test and characterize a communication link in a few seconds. An important problem which was posed in devising this analyzer was developing means for testing for noise in the link simultaneously with the testing of line loss and envelope delay characteristics. The latter characteristics are tested by sending a test signal through the link and analyzing the received signal spectral characteristics. However, the test signal is not required for and can interfere with the noise measurement.

Accordingly, an object of this invention is an improved method and means for measuring noise in a communication link.

Another object of the invention is an improved method and means for measuring noise by means of automatic test equipment.

Still another object of the invention is an improved method and means for measuring noise in a communication link simultaneously with the measurement of other communication link characteristics requiring the presence of a test signal.

These and other objects and features of the invention will be apparent from the following description and appended claims when taken with the drawings, in which:

Briefly, in accordance with the invention, noise in a communication link is measured in the presence of a test signal spectrum by selectively measuring noise in portions of the communication band frequency spectrum not occupied by the test signal. If the test signal spectrum for a typical 4,000 hertz bandwidth audio communication channel lies at 250 hertz intervals, the noise measurements may be taken at some or all of the frequencies lying between the spaced test signals. Suitable weighting and summing networks are provided to construct the weighted noise value across the communication channel.

Figure 1:
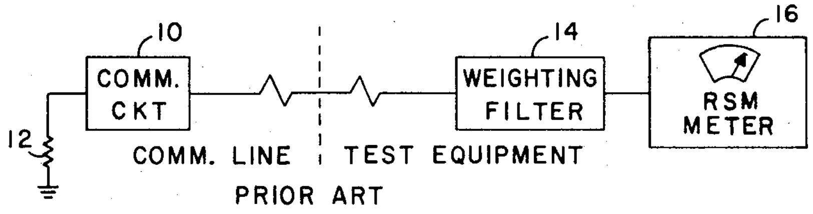
FIG. 1 is a functional block diagram of a prior art weighted noise measuring system.

Referring now to the drawings, FIG. 1 is a conventional weighted noise-measuring system in which a communication line including the communication circuit 10 terminated by a quiet resistive element 12 is monitored by a weighting filter 14 having a frequency response determined by a prescribed weighting curve and an RMS voltmeter 16. The line noise appearing at the output end of the communication circuit has a spectral distribution governed by the type of interference and noise pickup to which the circuit is subjected. The noise passed through the weighting filter 14 is then measured by the power detector or RMS voltmeter 16.

Figure 2:
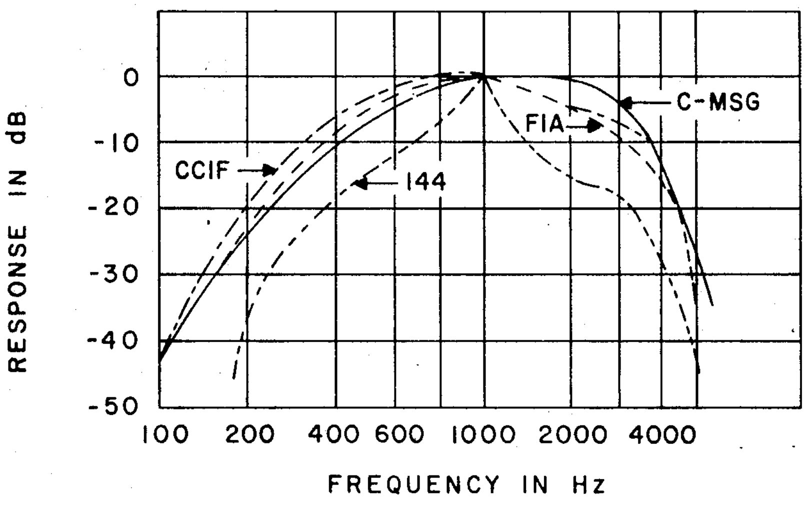
FIG. 2 is a graph representation of weighting curves used to define different response scales for communication systems.

In establishing noise-measurement standards, the interfering effect of noise is simulated by comparing the interference provided by a 1,000-hertz tone at a reference level with other frequencies. It is necessary to measure the "interfering effect" of noise since noise seems to create more interference with some frequencies in the audio range than at others. FIG. 2 shows weighting curves or "interference effect" curves for noise as measured by various conventional manually operated noise measuring equipment. A historical summary on noise measurements, noise units, and weighting curves can be found in "Noise," The Lenkurt Demodulator, Volume 13, No. 12, Dec. 1964.

While conventional noise measuring equipment measures the noise characteristic of a communication line by scanning the entire frequency spectrum of the communication line, in view of the described weighting curves, such measurements are not compatible with automatic test equipment which place a test signal on the communication line. For example, copending application Ser. No. 785,592 filed by Dulaney et al. for "Logic Pulse Time Waveform Synthesizer," assigned to the assignee of the present invention, discloses a waveform synthesizer wherein logic pulses in a pulse train are digitally separated, amplitude weighted and recombined to form a pulse time waveform having a predetermined frequency spectrum which is used as a test signal in the automatic communication link analyzer developed by Collins Radio Company. Delay measurement is achieved by means of a system disclosed in application Ser. No. 793,529, filed by Bergemann et al. entitled "Simultaneous Delay Measurement," assigned to the assignee of the present application, wherein differential envelope delay is measured for the transmitted test signal spectrum and a reference signal. One test signal spectrum utilized in the communication link analyzer as disclosed in the above-identified application Ser. No. 785,592 includes a plurality of signals spaced across a 4,000 hertz audio frequency band at 250 hertz intervals with two signals closely spaced about each 250 hertz interval by means of double-sideband, suppressed carrier techniques. Thus, when test signal frequency is used herein, this will include the case where only one test signal is positioned at this frequency and also the case where two or more test signals are closely spaced about the frequency.

Figure 3:
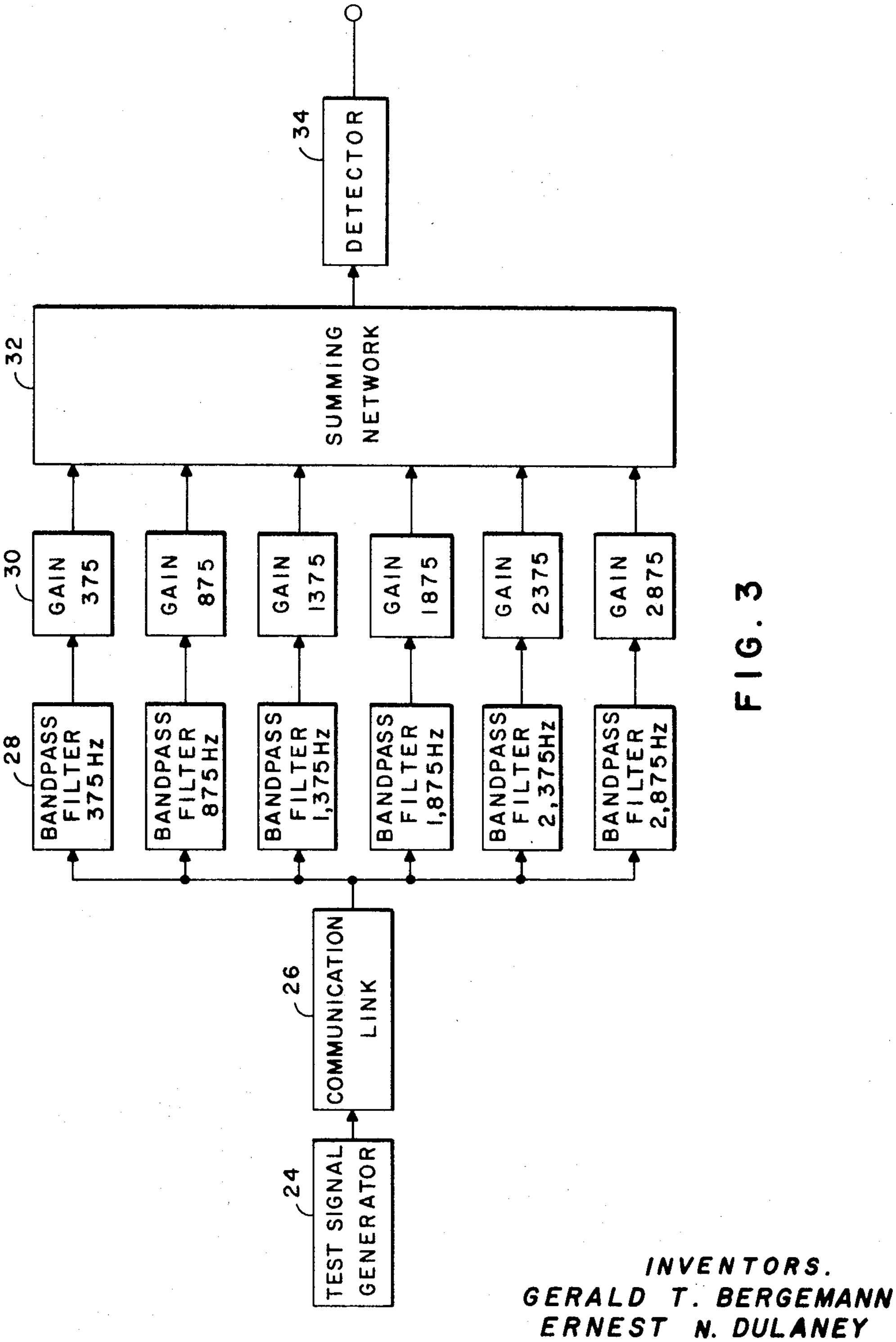
FIG. 3 is a functional block diagram of one embodiment of the weighted noise measuring system in accordance with the present invention.

FIG. 3 is an embodiment of the noise-measuring system in accordance with this invention which is compatible with the test signal generating equipment and measuring equipment disclosed in the above-referenced patent applications. Referring to FIG. 3, test signal generator 24 which produces a test signal spectrum, for illustration purposes, spaced at 250 cycles across a 4,000 hertz communication band, is connected to the transmission circuit 26 which is under test. Illustrated at the receiving end of the transmission circuit is the noise measuring system including a plurality of narrow band-pass filters 28 centered at 375 hertz, 875 hertz, 1,375 hertz, 1,875 hertz, 2,375 hertz, and 2,875 hertz. The noise passed by each band-pass filter is fed through a gain or attenuation network 30 which "weights" the noise within the specific frequency range in accordance with a desired weighting curve. To approximate the C-message weighting curve in FIG. 2, the gains of the weighting networks 30 are set approximately at −12 db., 0 db., 0 db., −1 db., and −4 db. for each band-pass filter from 375 hertz to 2,875 hertz, respectively. The outputs of the weighting networks 30 are summed in the summing network 32 which produces a noise-frequency spectrum, which in turn is detected by detector 34.

Figure 4:
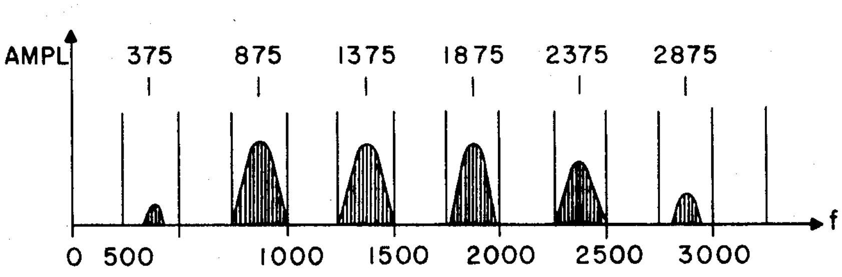
FIG. 4 is a spectral representation of the weighted noise measuring system of FIG. 3.

FIG. 4 is a frequency plot showing the relationship between the test signal frequency spectrum which is located at 250 cycle intervals across the 4,000 hertz frequency band along with the combined response of each band-pass filter and gain network which is positioned between pairs of test signal frequencies. Thus, by selectively positioning the band-pass filters with respect to the test signal frequency spectrum the test signals will not interfere with the noise measurement. Further, a realistic and useful weighted noise measurement is obtained through the use of a limited number of strategically positioned band-pass filters. In this embodiment the band-pass filters are placed between alternate pairs of test signal frequencies to minimize the number of required filters for forming the weighted noise spectrum. The number of filters may be increased, and though not necessary, uniform spacing is desirable. Significantly, the band-pass of the noise filters is chosen to provide rejection of the test signal. The bandpass curves illustrated in FIG. 4 are adjusted in amplitude scale to illustrate the attenuation of the noise gain network.

Figure 5:
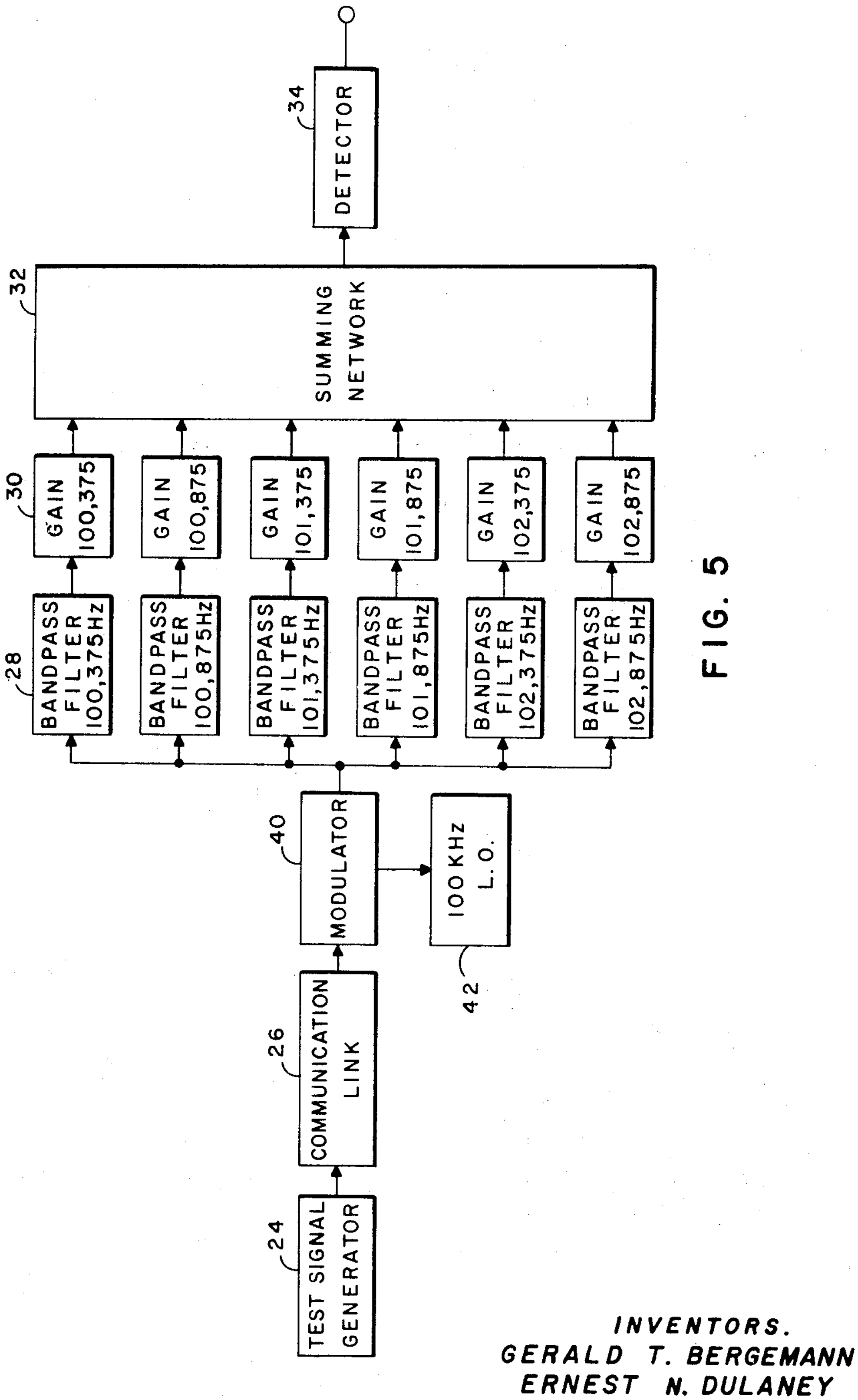
FIG. 5 is another embodiment of a weighted noise measuring system in accordance with the invention.

FIG. 5 is an alternative embodiment of the noise-measuring system including an advantageous modification. In this embodiment it will be noted that the noise-measuring equipment at the receiver end of the transmission circuit includes a mixer 40 which mixes the received test signal and noise with a 100 kilohertz signal from a local oscillator 42 and the modulated output signal is passed through a plurality of band-pass filters 44, similar to the band-pass filters of the system shown in FIG. 3, which are centered at 100,375 hertz, 100,875 hertz, 101,375 hertz, 101,875 hertz, 102,375 hertz, and 102,875 hertz. By increasing the frequency range by 100 kilohertz, the circuit shown in FIG. 5 has been easier to implement. The weighting network is frequency spaced at the appropriate intervals for the new frequency spectrum, corresponding to the upper sideband of the modulated signal, to accomplish the same function as described above with respect to the circuit of FIG. 3.

The described method and system for producing a weighted noise signal in the presence of a test signal spectrum has proven to be very successful in automatic communication link analysis equipment. While the invention has been described with reference to specific embodiments, it will be appreciated that various modifications and changes may be made by those skilled in the art without departing from the spirit and scope of the invention.

What is claimed is:

1. In an automatic communication link analyzer, a system for determining the weighted noise in the communication link simultaneously with the presence of a test signal spectrum including test signal frequencies spaced at a fixed increment across a communication frequency band comprising a plurality of band-pass filters spaced across said communication frequency band with each band-pass filter tuned in frequency to lie between a pair of test signal frequencies and having a sufficiently narrow bandwidth to provide rejection of said test signal, a plurality of attenuators each of which is connected to receive the signal passed by one of said band-pass filters, said attenuators attenuating the received signals in accordance with a desired frequency-noise weighting function, and summing means for receiving the output signals from said attenuators and constructing therefrom the weighted noise of said link.

2. A system in accordance with claim 1 wherein said band-pass filters lie in frequency between alternate pairs of said test signal frequencies.

3. A system in accordance with claim 1 wherein the band-pass of each of said band-pass filters does not exceed said fixed increment.

4. A system in accordance with claim 3 wherein said communication frequency band is 4,000 hertz, the number of band-pass filters is six spaced at 500 hertz intervals, and the test signal frequencies are spaced at 250 hertz intervals.

5. A system in accordance with claim 4 wherein two test signals are closely spaced about each test signal frequency.

6. A system in accordance with claim 1 and further including a signal generator for generating a signal at a frequency substantially higher than the highest frequency in said test frequency spectrum, and modulating means for modulating said generated signal with the output of said communication link thereby placing said communication frequency band at said substantially higher frequency.

7. A system in accordance with claim 6 wherein said communication frequency band is 4,000 hertz and said substantially higher frequency is 100 kilohertz.

* * * * *